Feb. 27, 1968   R. D. LIVINGSTON   3,370,549
TRANSFER APPARATUS
Filed Dec. 1, 1966   8 Sheets-Sheet 3
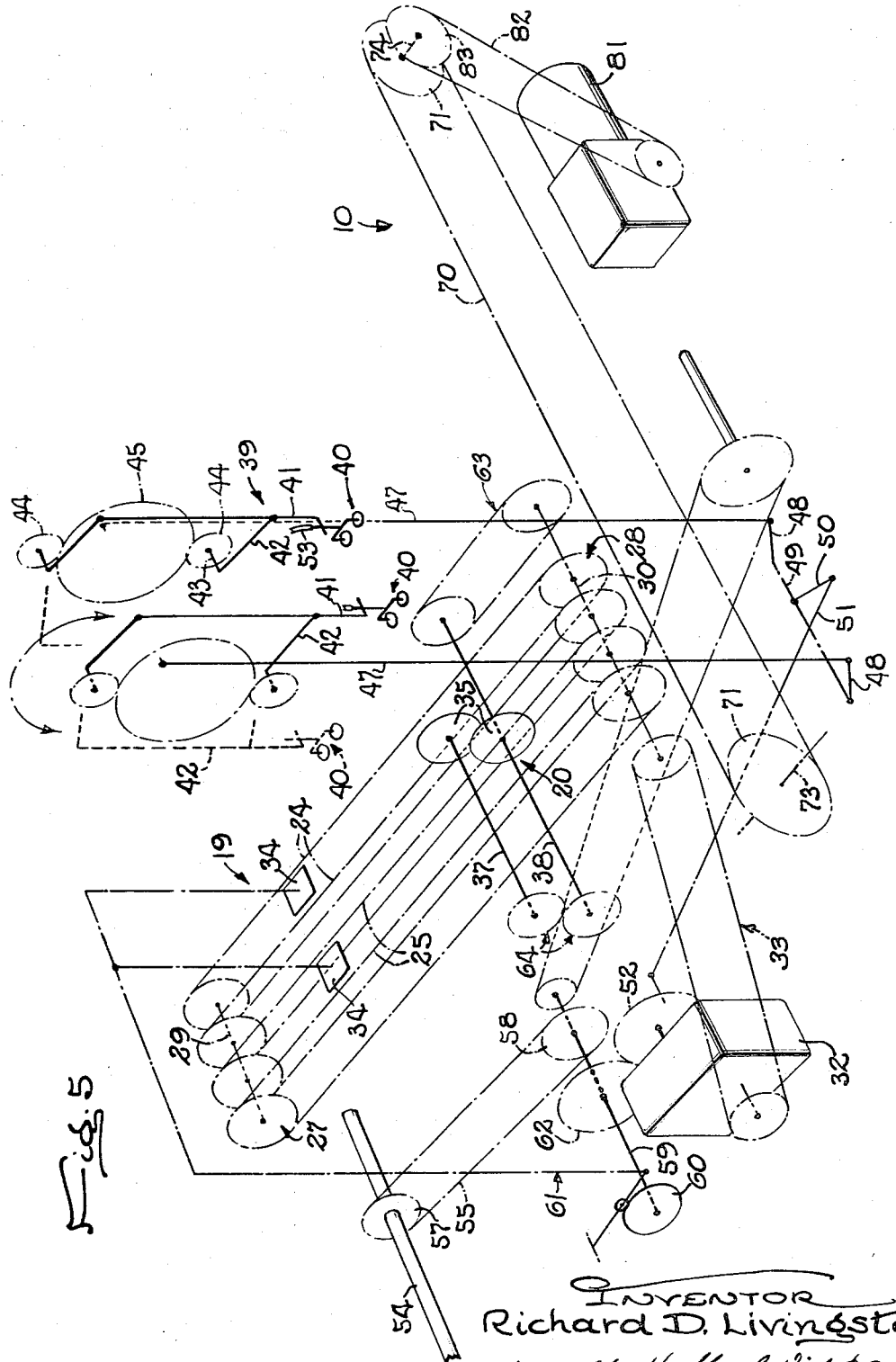
INVENTOR
Richard D. Livingston
by Wolfe, Hubbard, Voit & Osann
ATTORNEY

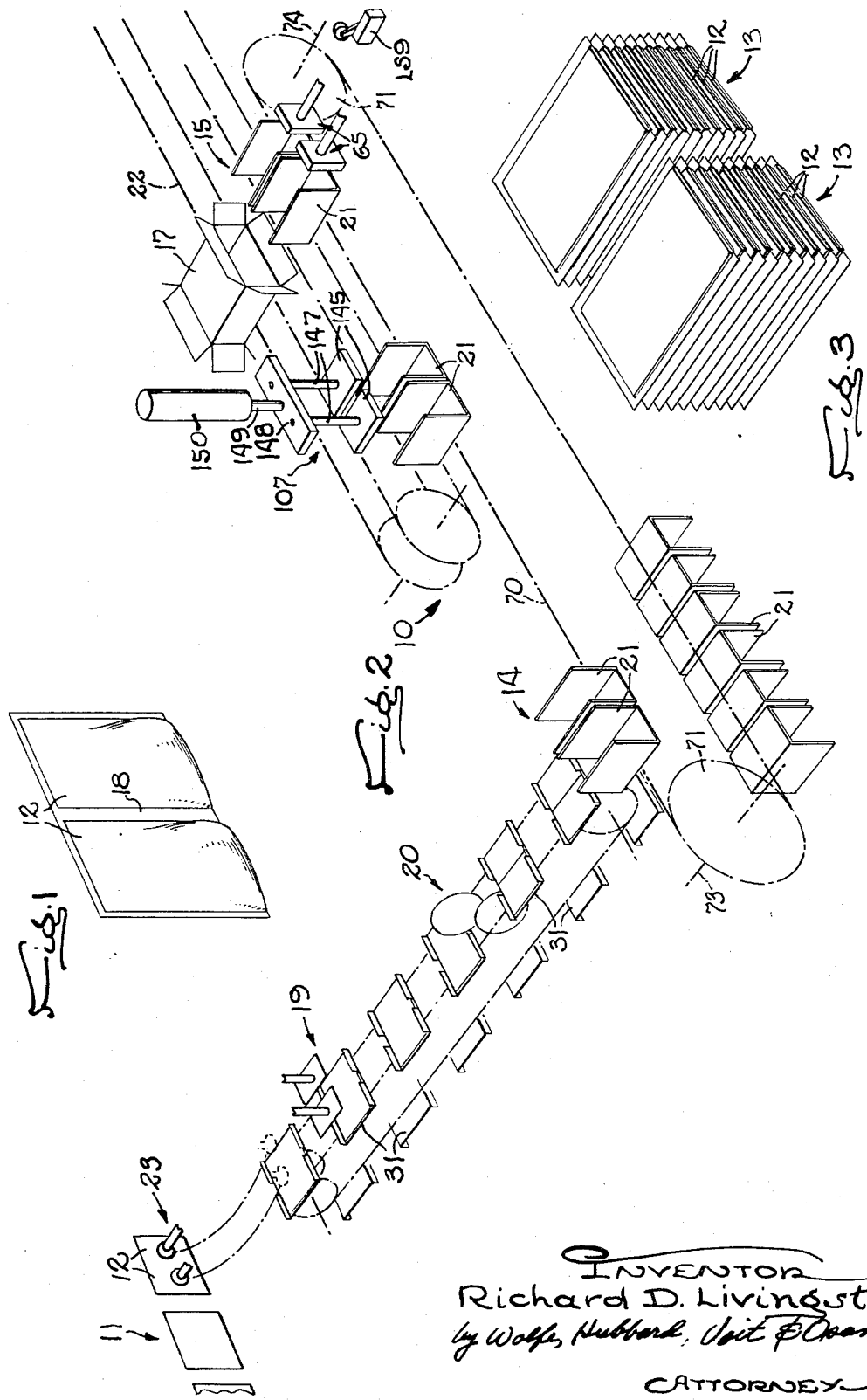

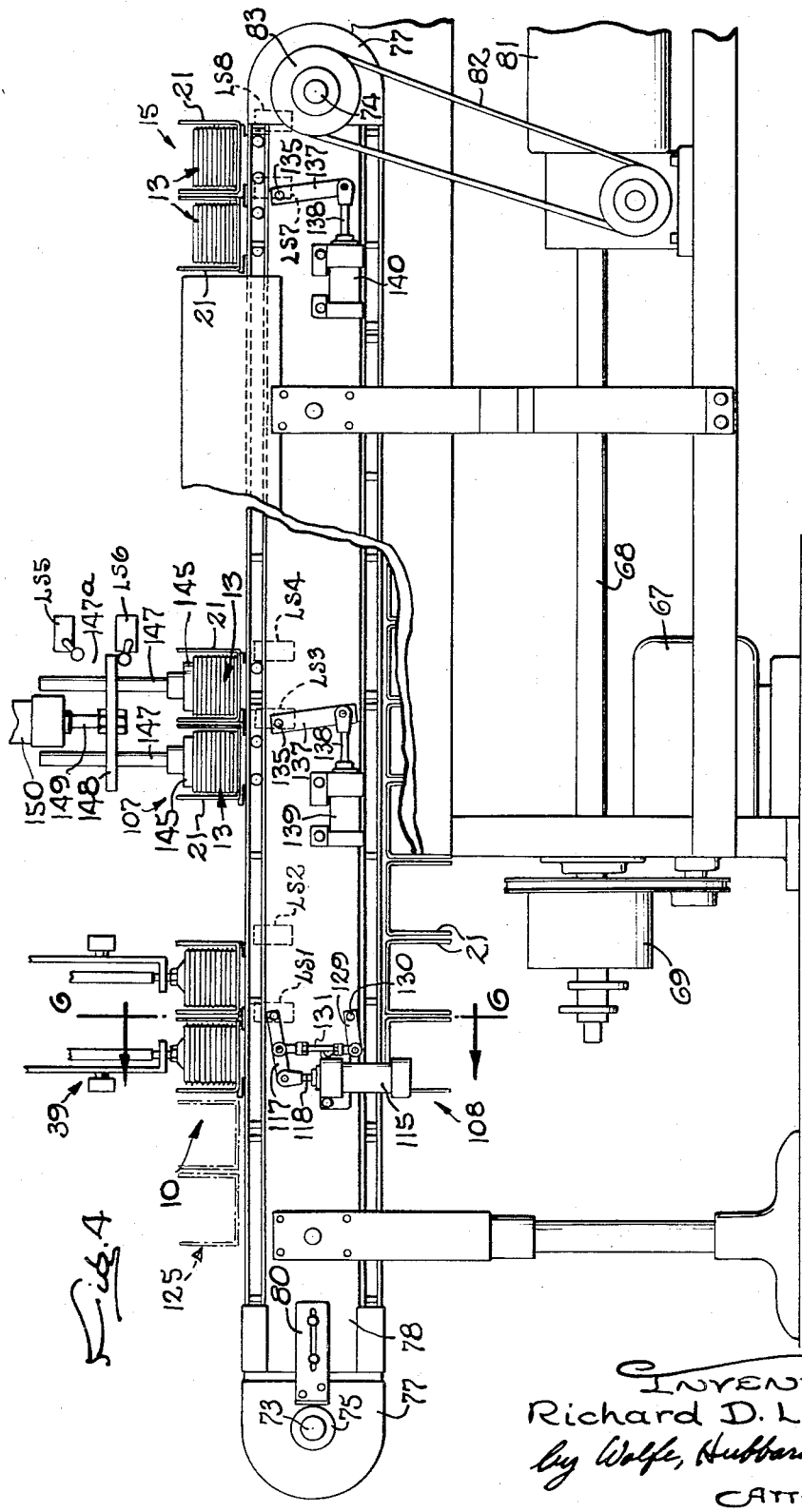

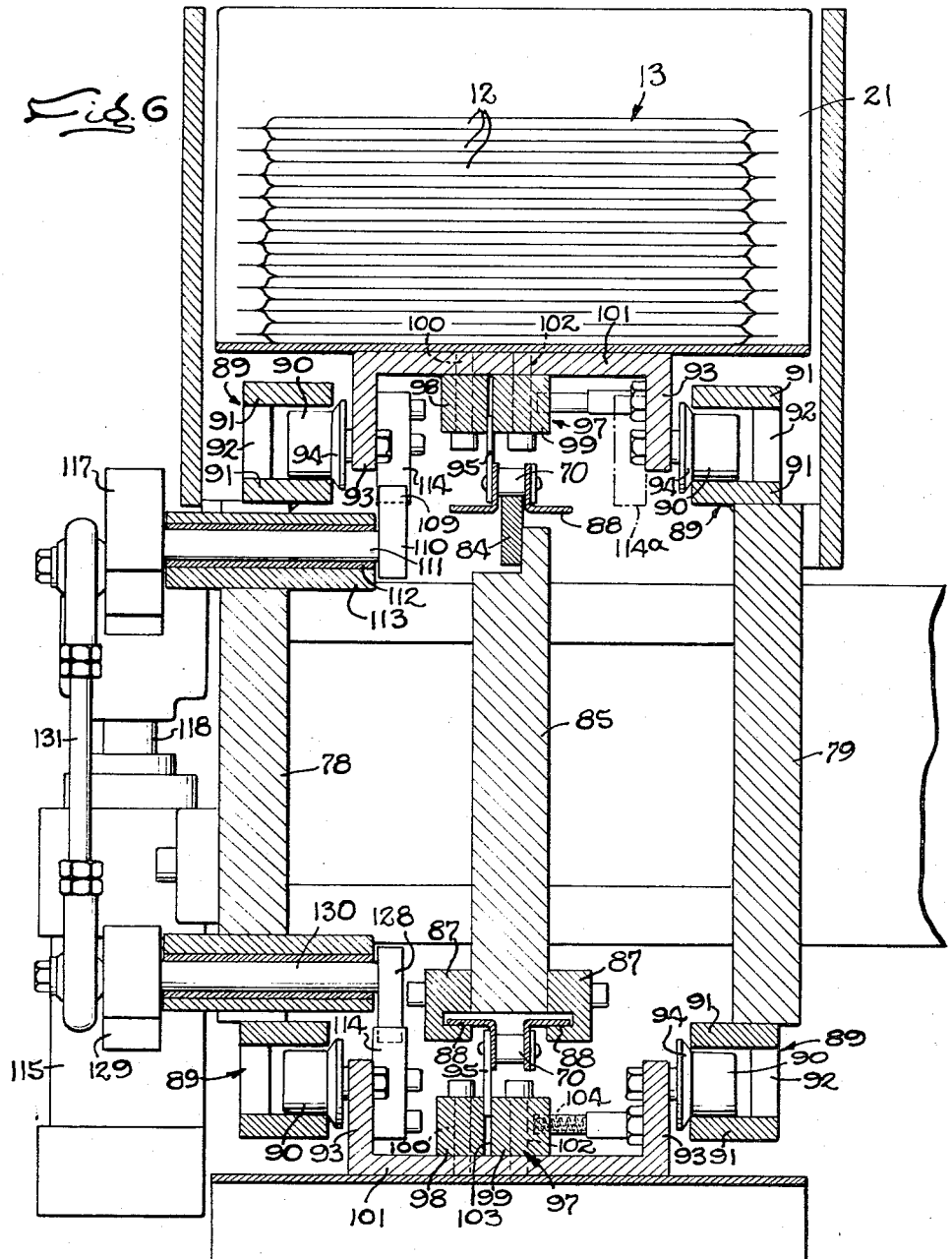

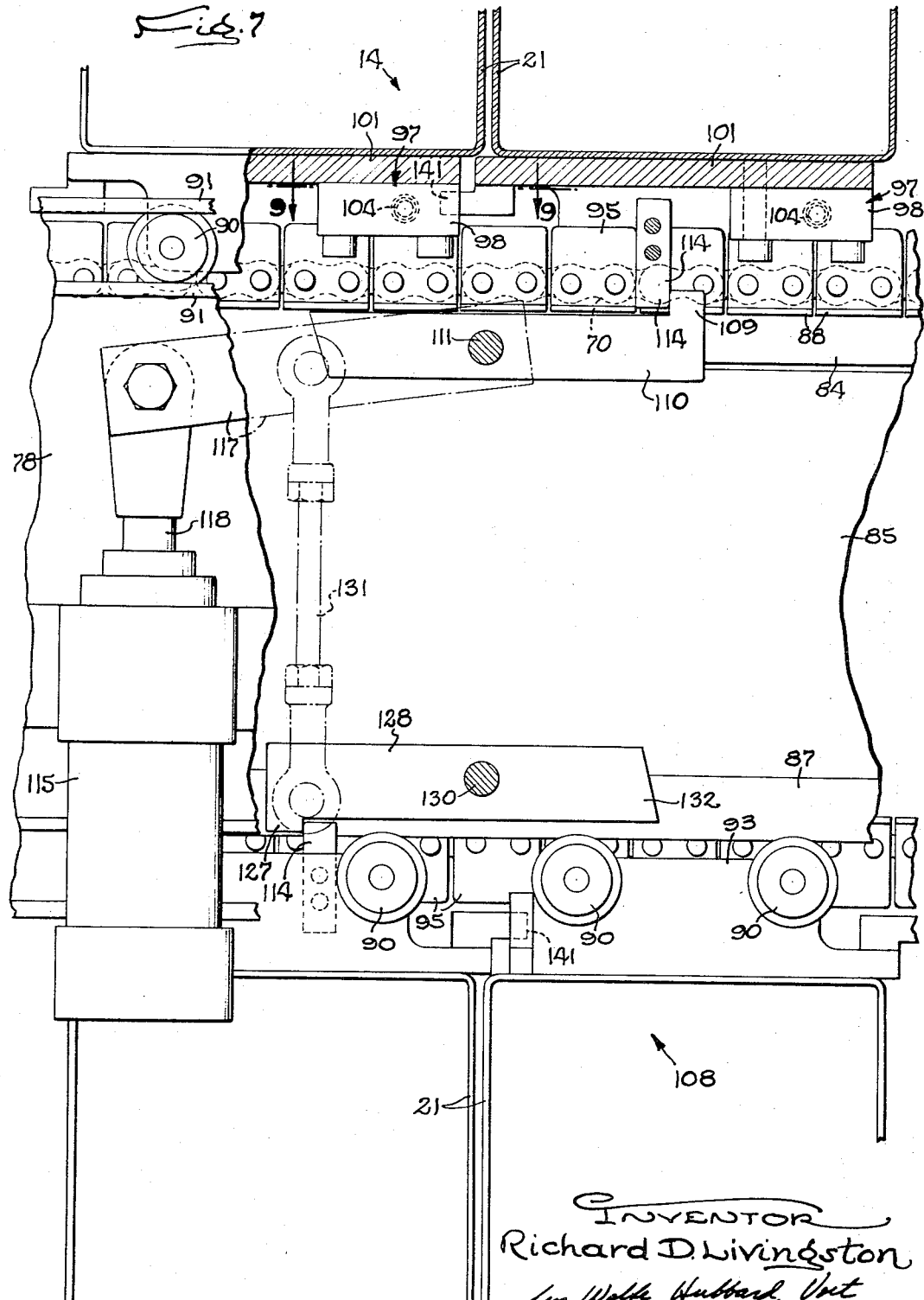

Feb. 27, 1968  R. D. LIVINGSTON  3,370,549
TRANSFER APPARATUS
Filed Dec. 1, 1966  8 Sheets-Sheet 6
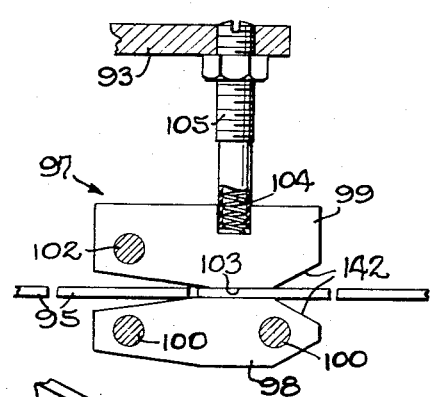
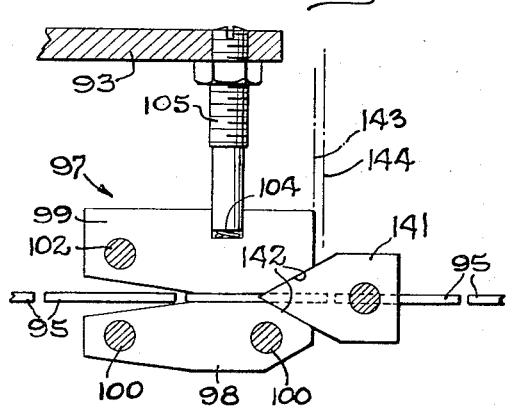
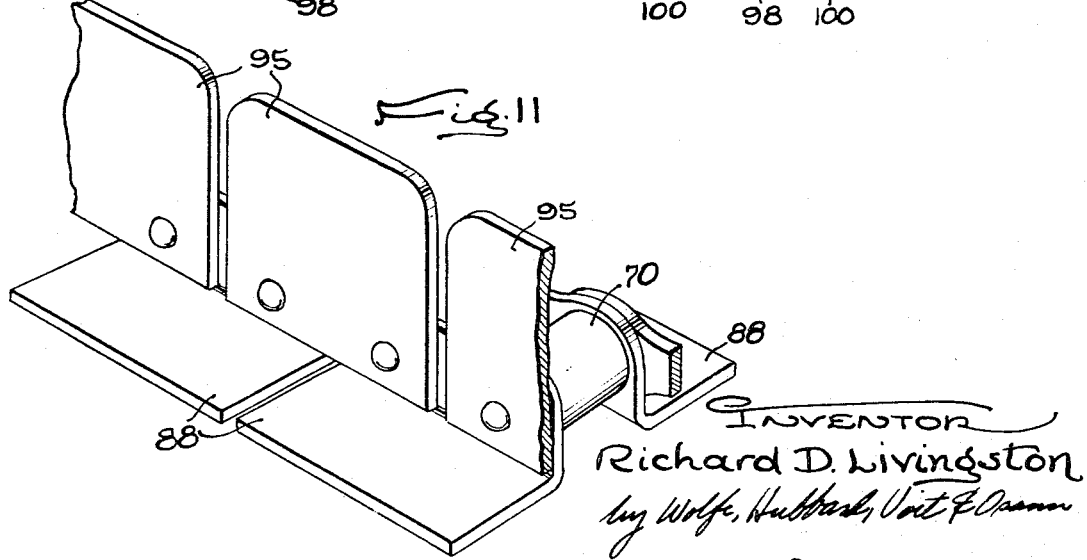
INVENTOR
Richard D. Livingston
by Wolfe, Hubbard, Voit & Osann
ATTORNEY

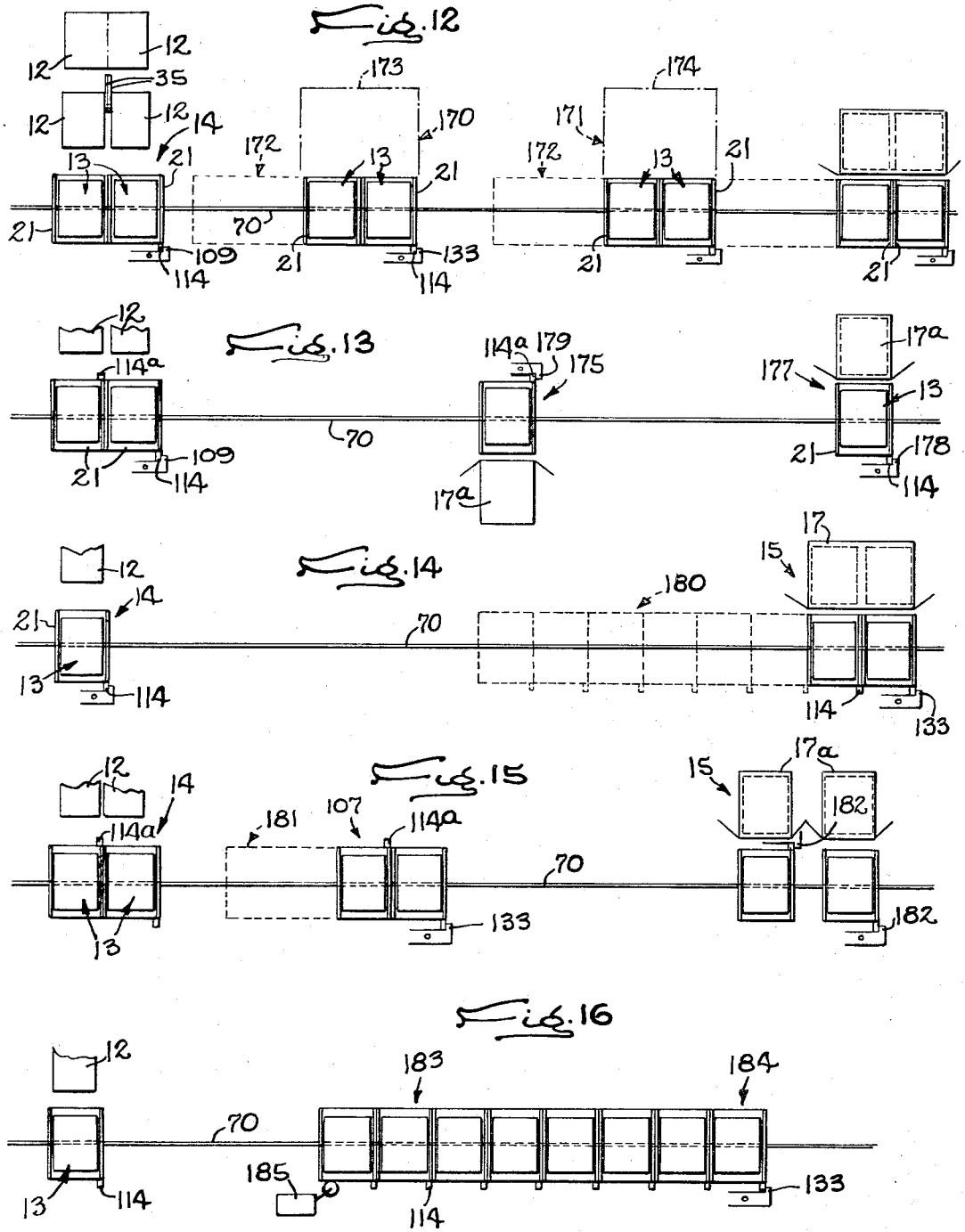

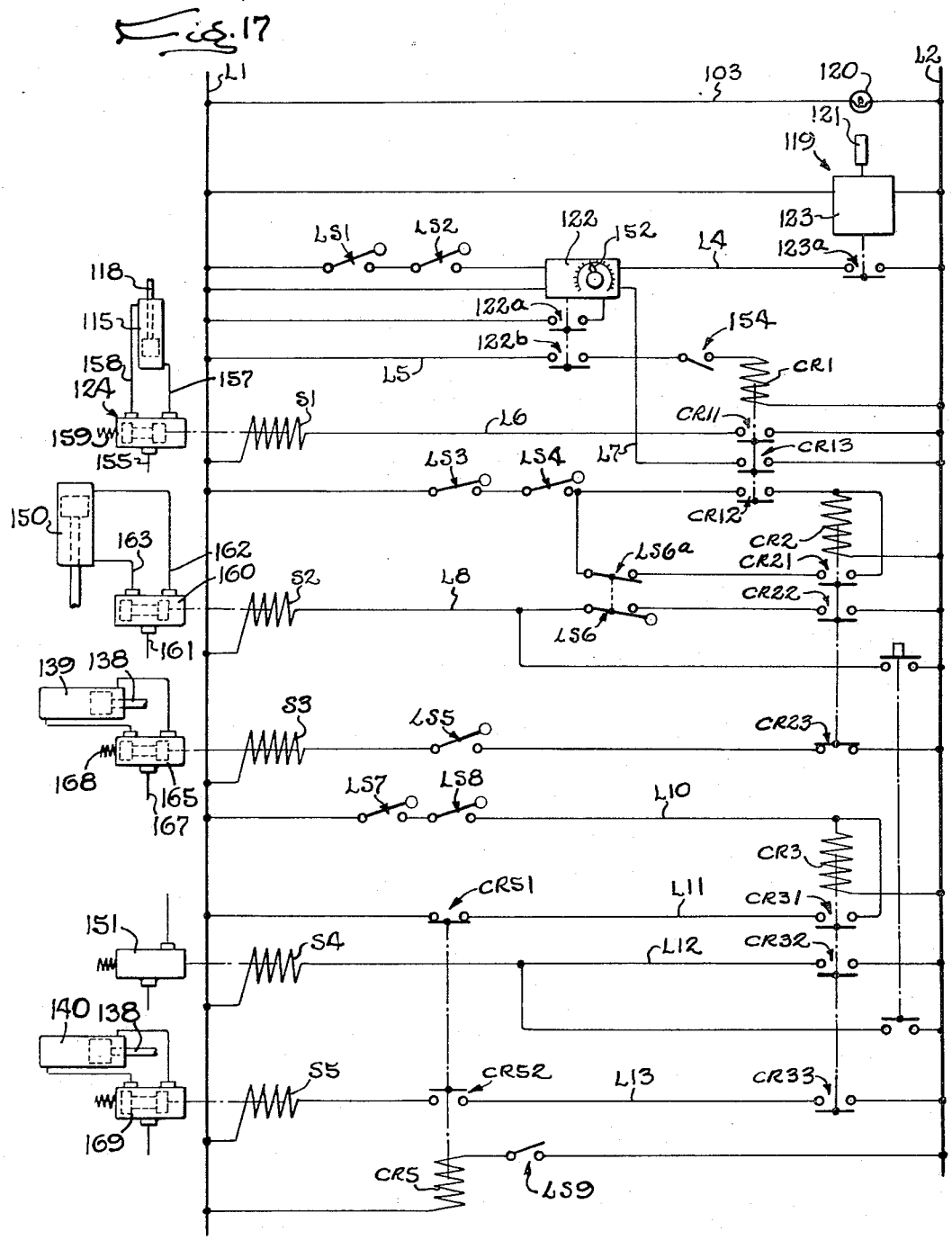

United States Patent Office 3,370,549
Patented Feb. 27, 1968

3,370,549
TRANSFER APPARATUS
Richard D. Livingston, Rockford, Ill., assignor to Bartelt Engineering Company, Inc., Rockford, Ill., a corporation of Delaware
Filed Dec. 1, 1966, Ser. No. 598,383
14 Claims. (Cl. 104—212)

ABSTRACT OF THE DISCLOSURE

Transfer apparatus of a packaging machine for receiving packages from the discharge end of a packager, arranging the packages in stacks, and delivering the stacks to a transfer station for insertion in cartons. The packages initially are joined in pairs which are separated on a discharge carrier of the packager and then are deposited in buckets at the end of this conveyor. The transfer apparatus includes an endless transfer conveyor having a drive member in the form of an endless chain with plates secured to the links of the chain to form a continuously moving friction band. The buckets are guided for movement along a path following the path of the chain and are releasably coupled to the friction band by clamping elements on the undersides of the buckets frictionally gripping the band so that the buckets normally are moved along their guides by the band. Positioned along the path of the buckets are a plurality of stops which engage opposed surfaces on the buckets to block further movement of the buckets along their path. Each stop is selectively movable by an actuator operable to move the stop out of its blocking position and release the bucket for continued movement along its path. Buckets are collected by such stops at a loading station at the end of the discharge conveyor, at an intermediate operation station where the stacks of packages are compacted, and at a transfer station where the stacks are loaded into cartons. In addition, a reserve supply of buckets is collected adjacent the loading station for release upon demand. A decoupling device is mounted on each of the buckets to release the clamping pressure of the following bucket as the latter moves into abutting engagement with a stopped bucket, and suitable controls are provided for automatically operating the stop actuators in timed relation with the various packaging operations to block and release buckets at the respective locations as required by the packaging sequence.

---

This invention relates to packaging machinery and, more particularly, to transfer apparatus having carriers for collecting articles such as packages from a package-making machine and delivering the packages to a second machine such as a cartoner for insertion of stacks of packages in cartons.

An object of the present invention is to provide a highly versatile transfer apparatus which eliminates the need for synchronization of the connected machines and facilitates the performance of different operations on the articles on the apparatus.

Another object is to provide a novel transfer apparatus in which the movements of the carriers are independent of each other and variably controlled in response to sensed conditions and needs for greater flexibility and versatility in the operation of the apparatus.

A more detailed object is to guide the carriers for movement with the conveyor along an endless path and to release each carrier from the conveyor to dwell in selected locations along the path, recoupling the carrier to the conveyor in response to sensed occurrences calling for movement of the carrier out of the dwell location.

A further object is to accomplish the uncoupling and recoupling of the carriers rapidly and in an extremely simple manner.

Other objects and advantages of the invention will become apparent from the following detailed description taken in connection with the accompanying drawings, in which:

FIGURE 1 is a perspective view of two bags of a type adapted to be handled by the illustrative machinery, the bags being joined together, FIG. 2 is a schematic perspective view illustrating the various steps performed by the machinery embodying the novel features of the present invention.

FIG. 3 is a perspective view of two stacks of bags of the type shown in FIG. 1, the bags having been separated.

FIG. 4 is a fragmentary side elevational view of transfer apparatus embodying the novel features of the present invention, with parts broken away for clarity of illustration.

FIG. 5 is a schematic perspective view of the drive trains for the various operating mechanisms of the machinery.

FIG. 6 is an enlarged fragmentary cross-sectional view taken substantially along the line 6—6 of FIG. 4 at the loading station.

FIG. 7 is an enlarged fragmentary side elevational view similar to the portion of FIG. 4 at the loading station, and partly broken away to show the stop mechanism.

FIG. 8 is an enlarged fragmentary view similar to FIG. 7 and showing the stop mechanism at the transfer station.

FIG. 9 is an enlarged view taken substantially along the line 9—9 of FIG. 7.

FIG. 10 is a view similar to FIG. 9 with parts in moved positions.

FIG. 11 is an enlarged fragmentary perspective view of part of the conveyor chain and the friction band.

FIGS. 12–16 are schematic plan views of different transfer arrangements.

FIG. 17 is an electrical circuit diagram of a representative contrtol circuit and components thereof.

As shown in the drawings for purposes of illustration, the invention is embodied in a transfer apparatus, indicated generally at 10 in FIGS. 2 and 4, disposed between the discharge end of a packager 11 to collect completed packages 12 in stacks 13 (FIG. 3) at a loading station 14 and deliver the stacks to a transfer station 15 for insertion into cartons 17. In this instance, the packages are envelope-type bags that are formed initially in pairs connected by a central seal 18 as shown in FIGS. 1 and 2, are flattened and separated as they advance step-by-step through stations 19 and 20 spaced along the discharge conveyor of the packager, and then are deposited in a pair of upwardly opening buckets 21 on the transfer conveyor while the buckets dwell in the loading station at the end of the discharge conveyor. After a preselected number of bags has been placed in each bucket, the conveyor advances the buckets out of the loading station and subsequentlty into the transfer station for insertion into a carton supported alongside the downstream end of the transfer conveyor on another conveyor 22 that is part of a cartoner. The filled cartons then are advanced step-by-step along the carton conveyor for the usual closing and sealing operations and eventual discharge from the machine.

The double bags are delivered to the discharge conveyor of the packager 11 by a conventional suction cup transfer device 23 (FIG. 2) which picks off successive bags in the vertical position shown and turns the bags into horizontal positions while carrying them to the discharge conveyor. Herein, this conveyor is formed by four endless chains 24, 25 (FIG. 5) disposed in side-by-side vertical planes and trained around two sets of sprocket wheels 27 and 28 mounted on parallel shafts 29 and 30 suitably journaled on the machine base. Spaced along the chains are two rows of shallow buckets 31 that open upwardly when on the upper runs of the chains, the buckets being arranged in laterally spaced pairs to receive a single bag in each bucket with the central seal 18 overlying the intervening space.

To advance the bags 12 on the discharge conveyor toward the loading station 14, the sprocket shaft 30 is turned step-by-step clockwise, as viewed in FIG. 5, by a stepping drive 32 connected to the shaft by a chain-and-sprocket drive 33. As each pair of buckets dwells in the tamping station 19, two reciprocating pressers 34 are shifted downwardly against the bags to press the latter flat against the buckets, and then are lifted away from the buckets for the next step of the conveyor. At the separating station 20, which is between two dwell positions of the buckets, two rotary blades 35 are disposed in a vertical plane alined with the space between the buckets of each pair and are rotatably supported on parallel shafts 37 and 38 to cut each double bag along the central seal 18 as the buckets pass on opposite sides of the blades. This completes a representative package-making operation with the two separated bags resting in each pair of buckes approaching the loading station.

The transfer to the stacks 13 in the buckets 21 is accomplished by an oscillating loader 39 shown schematically in FIG. 5 and having a pair of suction-cup grippers 40 movable back and forth along arcuate paths between pick-up positions over the buckets 31 of the discharge conveyor and release positions above the transfer conveyor buckets. For this purpose, each of the grippers is supported on an upright arm 41 pivoted on two parallel cranks 42 fast on shafts 43 carrying vertically spaced pinion gears 44 meshing with opposite sides of a large drive gear 45. A vertical link 47 is pivotally connected at its upper end to a pin on the drive gear and at its lower end to a crank 48 on a rock shaft 49 journaled on the machine base below the transfer conveyor. The rock shaft carries a downwardly extending crank 50 that is connected by a generally horizontal link 51 to a pin on the continuously rotating gear 52 which drives the stepping drive 32 thus, the horizontal link reciprocates endwise back and forth to oscillate the rock shaft and, through the linkages, oscillates both the drive gears and the pinion gears. This swings the parallel crank arms 42 from the positions shown in full in FIG. 5, upwardly and into the oppositely projecting positions shown in broken lines, and then back, to shift the grippers 40 first to the pick-up positions and over the buckets 31 then back to the release positions over the buckets 21. Suction is applied and released in the cups in the usual manner through flexible hoses 53 (FIG. 4).

It will be seen in FIG. 5 that the discharge conveyor and all of the devices associated with it, may be driven by a common shaft 54 which herein is the cycle shaft of the packager 11. An endless chain 55 driven by a sprocket wheel 57 on the cycle shaft drives a sprocket wheel 58 on an intermediate shaft 59 carrying a cam 60 for reciprocating the pressers 34 through a linkage indicated generally at 61. The intermediate shaft also carries a gear 62 meshing with and rotating the gear 52 to drive the oscillating loader 39 and the stepping drive 32. The slitter blades 35 are rotated by a chain-and-sprocket connection 63 between the sprocket shaft 30 and one end of the shaft 38 of the lower blade, with gearing 64 connecting the opposite ends of the blade shafts for rotation of the two blades in unison but in opposite directions.

As will be seen in FIGS. 2 and 4, two stacks 13 of bags 12 herein are formed at the loading station in two buckets 21 of upwardly opening U-shaped cross-section disposed side by side and, in effect, forming a compartmented carrier on the transfer conveyor. As each such carrier dwells at the transfer station 15, the two stacks are pushed laterally out of the buckets and into an alined carton 17 by a pair of rams 65 movable in timed relation with the carton conveyor 22 from retracted positions on the side of the buckets remote from the cartons, through the buckets into extended positions beside the open carton end, and then back through the buckets into the retracted positions. This transfer operation is completed during a dwell in the step-by-step motion of the carton conveyor, which is driven by a motor 67 (FIG. 4) driving the cartoner shaft 68 through an overload clutch 69. Of course, the stacks may be handled separately on the transfer conveyor in single-bucket carriers and inserted singly in smaller cartons.

In accordance with the present invention, the buckets 21 are guided on the machine base for movement along an endless path following the transfer conveyor and are releasably coupled to the conveyor for movement with the latter when movement is required, and for uncoupling of each carrier in one or more selected locations along the path. Each bucket or pair of buckets is movable independently of the others as required by the operations to be performed, may be held ready in selected locations until the need arises, and may be held in different operating stations for varying periods of time depending upon the needs of the particular operation. Accordingly, the transfer conveyor is highly versatile in its operation and makes it possible to adapt the machine for many different operations and combinations of operations.

In the present instance, the drive member of the transfer conveyor is an endless chain 70 disposed in a vertical plane and trained around horizontally spaced sprocket wheels 71 on shafts 73 and 74 (FIG. 2 and 5) journaled in bearings 75 (FIG. 4) supported on end plates 77 on two elongated parallel side rails 78 and 79 disposed on opposite sides of the conveyor and supported on upright posts constituting part of the machine base. The end plates at the left end of the machine are adjustably mounted on the rails and held in place by slidable connectors 80 for applying the proper tension to the chain, which is driven by a motor 81 driving an endless chain 82 rotating a sprocket wheel 83 on the shaft 74. As shown in FIG. 6, the upper run of the conveyor chain slides along a guide strip 84 on top of a central rail 85 and the lower run is braced against sagging by grooved guides 87 slidably receiving laterally projecting lugs 88 fast on the chain links.

Each bucket 21 is supported and guided independently of the conveyor chain 70 by means of two endless tracks 89 mounted on the side rails 78 and 79 and defining laterally opening grooves loosely receiving two rollers 90 journaled on the underside of the bucket. As shown in FIGS. 4 and 6, each track has upper and lower sections extending along the longitudinal edges of the associated side rail and curved sections formed in the end plates 77 to connect the upper and lower sections. The latter are formed by vertically spaced strips 91 connected by spacers 92 while the end sections are simply grooves in the end plates. The rollers are journaled on horizontal axles mounted on the depending legs 93 of a U-shaped bracket suitably secured to the underside of the bucket, and preferably are formed with flanged inner ends 94 as shown in FIG. 6.

To adapt the chain conveyor 70 for connection to the buckets 21, generally rectangular plates 95 (FIGS. 6 and 11) are fastened to one side of the chain in closely spaced relation in a common vertical plane thereby forming a substantially continuous flexible friction band on the chain. On the underside of each bucket is a slip-friction connector 97 which grips this band and thus couples the bucket to the conveyor for movement therewith. As shown most clearly in FIGS. 6, 9 and 10, each connector comprises a pair of jaws or blocks 98 and 99 mounted on the underside of the bucket on opposite sides of the friction band, one of the blocks being rigidly mounted on two pins 100 threaded into the crosspiece 101 of the bracket and the other being pivoted adjacent its trailing end on a single vertical pin 102 for swinging of its leading end portion toward and away from the other block to shift the clamping surface 103 of the block into and out of engagement with the band. A coiled spring 104 is seated at one end in a recess in the side of the pivoted block and compressed between the block and an adjustable stop 105 formed by a set screw threaded through the bracket leg 93 on the same side of the friction band to urge the block toward the band. A lock nut holds the set screw in different selected positions which determine the gripping force exerted by the spring on the connector and thus on the band.

With this arrangement, control of the movement of the buckets 21 along their path may be accomplished with relatively simple movable stops positioned in selected locations along the path for engagement with opposed surfaces on the buckets and movable out of the way to release the buckets for movement past the stops. One such stop is provided at the loading station 14 to hold one or more buckets in position to receive the bags 12 from the oscillating loader 39. In the illustrative embodiment, others are located at the transfer station 15, at an intermediate operating station 107 between the loading and transfer stations, and at a storage station 108 along the lower run of the conveyor.

As shown in FIGS. 4, 6 and 7, the stop at the transfer station 14 is a lug 109 projecting upwardly from the right end of a generally horizontal lever 110 pivoted intermediate its ends on the rail 78 by means of a pin 111 fast in a hole in the lever and projecting through a bushing 112 (FIG. 6) and a sleeve 113 supported on the rail. In the position of the lever shown in full in FIGS. 6 and 7, the stop lug is disposed in the path of a block 114 bolted to one of the depending legs 93 of the bracket on the underside of the bucket. Thus, as the bucket moves over the lever, the lug prevents passage of the stop block. Upon engagement of the two opposed stop elements, the bucket is stopped and, in effect, uncoupled from the chain conveyor as permitted by slipping of the friction band between the clamping blocks 98 and 99. The bucket, of course, is precisely positioned along its path according to the position of the stop lug.

To move the stop lug 109 into and out of the blocking position at appropriate times, an actuator 115, herein a pneumatic cylinder, is mounted on a bracket on the outer side of the rail 78 and connected to an operating arm 117 fast at one end on the outer end of the pivot pin 111, the piston rod 118 of the actuator being pivotally connected to the free end of the arm so that reciprocation of the piston rod rocks the arm up and down. Through the pivot pin, this rocks the stop lever 110 through a corresponding arc. When the piston rod is retracted as shown in FIG. 7, the stop lug is held in the raised, blocking position for engagement with the stop blocks 114. When the rod is extended to swing the free end of the operating arm upwardly, the stop lug is lowered out of the blocking position, permitting the friction connector on the released bucket to recouple the latter automatically and instantly to the friction band.

In the representative machine arrangement in which two buckets 21 are combined into a single compartmented carrier, stop blocks are omitted from every second bucket so that two buckets move as if joined together. The stop lug 109 engages the block 114 on the leading bucket of the pair to detain this bucket in the selected location, and the trailing bucket simply abuts against the leading bucket. When the stop lug is lowered momentarily to release the first bucket, the second moves freely past the lug, even if the latter has been raised back into its blocking position. It will be evident that the same result could be obtained by carefully timing the operation of the actuator 115 relative to the speed of the conveyor 70. The use of stops only on selected buckets, however, eliminates the need for careful timing.

The operation of the pneumatic cylinder 115 is controlled by a sensing device 119 (FIG. 17) which counts the bags 12 as they are placed in the two buckets 21 dwelling in the loading station 14 and produces an actuating signal when the stacks 13 attain the desired size. Herein, the sensing device comprises a lamp 120, a photoelectric cell 121 actuated by bags passing in front of the lamp during delivery to the buckets, and a counter 122 actuated by the relay 123 of the cell and operating a valve 124 through which pressurized air is delivered to the cylinder 115. After the preselected number of bags has been placed in the buckets, the valve is opened momentarily to admit a charge of air into the lower or head end of the cylinder and then is returned to its initial position to admit air into the upper or rod end of the cylinder and return the piston rod 118 quickly to its retracted position in which the stop lug 109 is held in the blocking position.

The approach of buckets 21 to the loading station 14 is controlled by another stop for preventing the buckets from backing up around the curved portion of the conveyor. Preferably, one or more pairs of buckets are held in a stand-by position at 125 (FIG. 4) immediately in advance of the loading station, and the remaining reserve buckets are held at the storage station 108. Herein, the second stop also is a lug 127 on a lever 128 pivoted between its ends on the side rail 78 but positioned at the storage station along the lower run of the conveyor generally beneath the transfer station. The stop lug depends from the left end of the lever for engagement with the blocks 114 projecting upwardly from the buckets which of course, are inverted as they move along the lower run. With the two stop levers so arranged, it is possible to use the pneumatic cylinder 115 not only to release the buckets that have just been filled but also to release another pair of buckets for movement around the left end of the conveyor toward the loading station. All that is needed is a second operating arm 129 (FIGS. 4 and 6) on the outer end of the pivot pin 130 of the lower stop lever, and an upright link 131 pivotally connecting the central portions of the two arms for rocking in unison. As the free end of the upper operating arm swings upwardly, the link lifts the lower arm to rock the lower stop lever clockwise and raise the lower stop lug out of its blocking position to release a pair of buckets.

It will be evident that all of the reserve buckets backed up along the lower run of the conveyor 70 behind the lower stop 127 will begin to move with the conveyor as soon as the stop is lifted. To eliminate the need for quick return of this stop to its blocking position, the right end surface 132 (FIG. 6) of the lower lever is used as an auxiliary stop disposed into the path of the next stop block 114 when the stop lug is raised, thereby preventing additional buckets from passing the lever after the release of one pair of buckets. As the stop lug is returned to its blocking position, the auxiliary stop is raised out of its blocking position to release the buckets for movement.

At the intermediate and loading stations 107 and 15, the buckets 21 are stopped by lugs 133 (FIG. 8) which project upwardly from the free ends of levers 134 each pivoted near its left end on the side rail 78 by means of a pin 135 projecting through the rail. Outside the rail, an arm 137 secured to each pivot pin extends downwardly from the pin and is pivotally connected to the rod 138 of horizontally disposed pneumatic actuators 139 and 140 fastened to the side rail so that back and forth movement of each piston rod rocks the associated operating arm back and forth to rock the stop lug up and down. In these instances, the rods normally are extended to hold the lugs in raised positions and are retracted to the left to lower the lugs for release of the buckets.

To reduce the drag on the conveyor 70 by the buckets 21 held behind the various stops, the decoupling device is mounted on each of the buckets to release the clamping pressure of the block 99 on the following bucket as the latter moves into abutting engagement with the stopped bucket. In this instance, the decoupling device is simply a wedge 141 (FIG. 10) fastened to the central portion of the bracket crosspiece 101 (FIG. 6) and projecting rearwardly therefrom level with the two blocks 98, 99 on the following buckets so as to enter between the loading end portions of the blocks which preferably are beveled at 142, and cam the blocks apart as they engage the wedge. The camming action takes place as the trailing bucket moves ahead from the position indicated at 143 in FIG. 10 to the position indicated at 144. The extent of separation may be very slight and need be only enough to relieve the pressure exerted on the friction band. When the leading bucket is released by its stop, the initial motion of the bucket pulls the wedge 141 from between the clamping blocks and thus releases the movable block to the action of its spring 104 for immediate recoupling of the trailing bucket to the conveyor. Although means could be provided for releasing the clamping pressure of the connector on the leading bucket as well, it has been found that the drag exerted by the one bucket at each stop is not serious enough to require attention.

While various operations may be performed at the intermediate station 107, herein the operation is the pressing or tamping of the stacks 13 by two vertically movable rams 145 (FIGS. 2 and 4) on vertical rods 147 carried by a horizontal crossbar 148. The crossbar is mounted on the lower end of the vertical rod 149 of a pneumatic cylinder 150 which presses the rams downwardly into two buckets while the latter are held by the stop lug 133 in the intermediate station in alinement with the rams. The initiation of operation of the cylinder is controlled by sensing means such as two limit switches LS3 and 4 (FIGS. 4 and 17) operated by the buckets in the intermediate station, and release of the buckets for movement on to the loading station is initiated automatically in response to the completion of the pressing operation as sensed by a switch LS5 operated by a dog 147a on one of the rods 147 as the rams return to their raised position. Another switch LS6 is operated by the crossbar in the lowered position of the rams to terminate the pressing stroke and initiate the return stroke. It will be evident that other operations, such as the insertion of a coupon in each bucket, may be performed at additional intermediate stations spaced along the conveyor, using mechanisms that are well known to those skilled in the art.

When the two buckets 21 arrive at the transfer station 15, the lug 133 on the lever 134 engages the stop block 114 on the underside of the leading bucket and stops both buckets in a precisely located position determined by the position of the lug. The loading rams 65 are supported in a conventional manner alongside the conveyor at the transfer station for horizontal movement through the two buckets and then back, pushing the stacks 13 from the buckets and into the waiting carton 17 during the forward stroke. To initiate the transfer operation, sensing means such as one or more limit switches LS7 and LS8 are positioned along the bucket path near the loading station to signal when two loaded buckets are ready. A carton may be drawn down from the usual magazine (not shown) and positioned on the carton conveyor in response to arrival of the buckets at the transfer station, or as the buckets approach the station, and the release of the empty buckets after the transfer is initiated in response to return of the rams to their retracted position, as sensed by a switch LS9 (FIGS. 2 and 17).

In operation, the illustrative machine is controlled automatically by the circuitry shown in FIG. 17 for operating the bag counter 122, the stop actuators 115, 139 and 140, the tamping cylinder 150, and also a carton draw-down actuator 151 for initiating feeding of cartons to the transfer station 15. In the circuit diagram, the main power lines are indicated at L1 and L2 and the various relays and solenoids are shown in deenergized condition.

Beginning with the packager 11 and the three conveyors running, a pair of buckets 21 held in the loading station 14 by the stop lug 109, and the remaining buckets stacked behind the lug 127 at the storage station 108, each bag 12 delivered by the loader 39, passes between the lamp 120 and the photoelectric cell 121 to produce a signal, actuating the cell relay 123. Herein, the lamp is continuously energized through a line L3 connected across the power lines L1 and L2, and interruption of the beam of the lamp causes the relay to close its switch 123a momentarily. This switch is in a line L4 connecting the counter 122 across the power lines through two switches LS1 and LS2 which are positioned at the loading station 14, as shown in FIG. 4, to be closed only when two buckets are in the loading station, thereby signaling that the buckets are ready to receive bags from the loader. The photoelectric cell senses the loading of each bag 12 and momentarily completes a circuit through the counter to advance its arm 152 ahead step by step until the preselected number of bags has been counted. When this has been accomplished, the counter closes its switches 122a and 122b to initiate movement of the buckets from the loading station to the intermediate station 107.

For this purpose, the counter switch 122a completes a holding circuit around the switches LS1 and LS2, while the switch 122b closes in a line L5 in the circuit of a relay CR1. Another switch 154 in this line is open whenever the loader is over the transfer conveyor 70 and closed only when the loader has returned to its pick-up position, thus insuring that relay CR1 can be energized only when the loader is out of the way. Closure of switch 154 after the counter counts out completes the circuit through relay CR1 which then closes its normally open switches CR11, CR12 and CR13. It will be seen that switch CR11 completes a circuit through line L6 and a solenoid S1 for operating the valve 124 controlling the flow of pressurized air from a supply line 155 to lines 157 and 158 leading to opposite ends of the stop cylinder 115 at the loading station.

When solenoid S1 is energized, the valve spool is pulled to the right to admit air into line 157 and thus extend the piston rod 118 upwardly. This rocks the stop lever 110 (FIG. 7) clockwise to lower the stop lug 109 and release the buckets 21 for movement with the conveyor 70. Of course, the clamping elements 98 and 99 of the leading bucket are in sliding frictional engagement with the friction band even while the buckets are stationary, and thus immediately grip the band to move the bucket out of the loading station. As the leading bucket moves away, the wedge 141 (FIG. 10) releases the movable clamp block 99 of the trailing connector 97 which thus grips the band and immediately couples the trailing bucket thereto for movement with the leading bucket.

At the same time, the two empty buckets 21 in the stand-by position 125 ahead of the loading station 14 are released to move into the station as the loaded buckets move out. To catch these buckets, the stop lug 109 is raised back into its blocking position as soon as the stop element 114 on the leading loaded bucket has passed. This is initiated by switch CR13 which closes in line L7 and resets the counter 122 simultaneously with the energization of the valve solenoid S1, opening the counter switches and thereby deenergizing relay CR1 to open switch CR11 in line L6. The valve spool is returned to the left by its spring 159 (FIG. 17) to admit air into line 158 leading to the rod end of the cylinder 115, thus retracting the rod 118 to raise the stop lug into the blocking position before the stop element on the next empty bucket passes.

As each pair of filled buckets is released at the loading station 14, two additional empty buckets are released at the storage station 108 by the rocking of the lower stop lever 128 in unison with the upper lever to raise the lower stop lug 127 out of its blocking position. This lug also is returned almost immediately to its blocking position although the auxiliary stop 132 holds the next pair of buckets in reserve.

The down stroke of the rams 145 is initiated by a relay CR2 which is energized only when three switches—LS3, LS4 and CR12—are closed. Switches LS3 and 4 close as the two loaded buckets move into position at the intermediate station and are stopped and held under the rams by the lug 133. The next time relay CR1 is energized by the counter 122 and switch 154, switch CR12 is closed momentarily to complete the circuit to relay CR2. When energized, relay CR2 closes its switch CR21 to complete a holding circuit around switch CR12 through normally closed switch LS6a, and also closes switch CR22 in a line L8 leading to a solenoid S2 for operating the valve 160 of the tamper cylinder 150. This switch completes the circuit through normally closed switch LS6 to solenoid S2 which thus shifts the spool of the valve to the right to admit air from a supply line 161 to a line 162 leading to the upper end of the cylinder 150. This shifts the rams down to press the stacks 13 downwardly to a preselected height in the buckets. Switch CR23 is open in the circuit of the stop actuator 139 so the stop lug 133 remains in its blocking position and holds the buckets stationary during the tamping operation. Switch LS5 is closed momentarily and idly during the down stroke by the dog 147a.

At the end of the down stroke of the rams, the crossbar 148 engages the operator of switch LS6 to open the latter and deenergize the valve solenoid S2, thus releasing the valve spool to the action of its return spring 164 which shifts the spool to the left to admit air through line 163 into the lower or rod end of the cylinder to retract the rams. When switch LS6 opens, its companion switch LS6a also opens to break the holding circuit for relay CR2 which thus is deenergized to close switch CR23.

Near the end of the up stroke of the rams, the dog 147a closes switch LS5 in passing and thereby signals that the tamped buckets are ready for release, energizing the solenoid S3 of the stop cylinder valve 165 to operate the valve and shift the valve spool to the right. This admits air from a line 167 into the right or rod end of the cylinder 139 to retract the rod 138 and rock the connected stop lever downwardly to release the two tamped buckets. After the dog 147a has passed the switch LS5, however, the switch reopens to deenergize the solenoid S3 and release the spool to the action of the return spring 168. Thus, air is supplied to the left end of the cylinder to extend the rod and return the stop lug to its blocking position.

The operation at the transfer station 15 is similar. The two buckets 21 carrying the tamped stacks 13 close switches LS7 and LS8 upon entering the transfer station, thereby signaling that the stacks are positioned for loading into a carton 17. While the transfer operation herein is initiated with only two buckets ready for unloading, it will be apparent that the transfer operation also may be initiated with two or more loaded buckets held in standby positions ahead of the transfer station.

In this instance, closing of switches LS7 and LS8 completes an energizing circuit through line L10 and relay CR3 which closes its switch CR31 for a holding circuit through line L11 and switch CR51, and also closes switch CR32 in line L12 to complete a circuit to a solenoid S4 of the carton draw-down operator 151 to initiate the feeding of a carton 17 to the transfer station 15 and also initiating the loading stroke of the rams 65, both the draw-down and the loading being accomplished with conventional mechanisms (not shown) in timed relation with the stepping of the carton conveyor. When the rams have been retracted switch LS9 (FIGS. 2 and 17) is closed in the circuit of a relay CR5 which closes its switch CR52 in line L13 connecting solenoid S5 across the power lines through previously closed switch CR33. Solenoid S5 operates the valve 169 of the stop actuator 140 to extend the piston rod 138 and lower the connected stop lug 133 to release the now empty buckets. As soon as the empty buckets move out of the transfer station, switches LS7 and LS8 open, at least momentarily, and deenergizing relay CR3 to open switch CR33 and deenergize the stop solenoid so that the stop is returned to its blocking position to catch the next bucket.

The versatility of the transfer apparatus is illustrated in FIGS. 12–16 in which some of the many possible variations are shown. In FIG. 12, the buckets 21 are handled two-by-two, in the manner previously described, simply by omitting stop elements on alternating buckets. Two intermediate stations 170 and 171 are shown, with the positions of standby buckets shown at 172 and two buckets held in each intermediate station in alinement with an operating mechanism 173, 174.

In FIG. 13, the bags 12 are loaded into two buckets 21 at the loading station 14, but the two stacks 13 are transferred into different cartons 17a at separated stations 175 and 177 spaced along the conveyor. At the loading station, both buckets are held by the lug 109 on the lever 110 and are released simultaneously. The first bucket moves all the way to a stop 178 at the last station 177, but the second bucket is caught in the intermediate station 175 by a stop 179 on the opposite side of the conveyor from the stops 109 and 178, this stop engaging a stop element 114a on the adjacent side of every second bucket.

FIGURE 14 shows buckets loaded one-by-one at the station 14 and unloaded two-by-two into cartons 17 at the station 15. Any desired number of loaded buckets may be stacked up in reserve at 180 between the two stations. In FIG. 15, the buckets are handled two-by-two at the loading and intermediate stations 14 and 107, the position of standby buckets being shown at 181, and are unloaded simultaneously into two side-by-side cartons 17a at the station 15 while held by two separated stops 182. In FIG. 16, the buckets are loaded one-by-one and then are accumulated at 183 in front of an intermediate station 184. A switch 185 positioned a preselected distance ahead of the intermediate station is closed momentarily by each passing bucket. When this switch is held closed by a stationary bucket, this constitutes a signal that the accumulation has reached a preselected quantity of buckets, and the signal is used to shut down the packager 11 until the switch reopens. The staggered arrangement of the various stations in FIGS. 12–16 shows that various stops and operating mechanisms may be located at random along the conveyor without any limitation as to step length, the steps being infinitely variable.

From the foregoing it will be evident that the transfer apparatus 10 is a highly versatile and flexible mechanism that may be adapted to many and varied sequences of operation. The feed into the transfer conveyor from the packager may be out of phase with the feed out to the cartoner, eliminating the need for careful synchronization of the three connected machines. The cartoner may even be stopped for a short period of time without stopping the packager.

I claim as my invention:

1. In a packaging machine, the combination of, an endless drive member, mechanism for driving said member at a predetermined rate, a succession of buckets, means guiding said buckets for movement along an endless path following said member and passing through spaced loading and transfer stations, plates secured to said member and projecting away from the latter in a common plane to form a continuously moving flexible friction band, opposed clamping elements on each bucket disposed on opposite sides of said band and frictionally gripping the latter to couple the buckets to the member for movement along said path by the member, a first stop disposed in a blocking position adjacent said loading station, opposed elements on said buckets each engageable with said stop as the associated bucket enters the loading station whereby to hold the bucket in a precise location determined by the location of the stop, mechanism for loading a preselected number of articles in said buckets at said loading station, means operable in response to loading of said preselected number in each bucket to move said stop out of said blocking position to release a bucket and then back to said blocking position to stop a subsequent bucket, a second stop at said transfer station disposed in a blocking position to engage stop elements on said buckets and hold the buckets in a precise location at the transfer station, mechanism for transferring the articles out of the buckets at the transfer station, and means operable in response to completion of the transfer to move said second stop out of its blocking position to release unloaded buckets and then back to stop a subsequent bucket.

2. The combination defined in claim 1 in which said opposed elements are mounted only on selected buckets to handle the buckets in groups forming compartmented carriers.

3. The combination defined in claim 1 in which one of said clamping elements is a block pivotally mounted on the associated bucket, and further including a spring for urging said block toward said band, and means for selectively adjusting the spring force to vary the gripping force exerted on the band.

4. The combination defined in claim 3 further including a decoupling element on the trailing sides of said buckets engageable with the blocks on the following buckets when the buckets are together and operable to relieve said gripping force until the buckets are separated.

5. The combination defined in claim 1 further including a third stop disposed in a blocking position at an intermediate station between said loading and transfer stations, mechanism at said intermediate station for performing an operation on the loaded buckets held by said third stop, and means operable in response to completion of said operation to move the third stop out of its blocking position to release a bucket and then back to the blocking position to stop a subsequent bucket.

6. The combination defined in claim 1 further including a fourth stop disposed on a blocking position at a storage station between said transfer station and said loading station to hold buckets until needed at said loading station, and means operable in response to release of buckets at said loading station to move the fourth stop out of its blocking position to release a bucket and then back to the blocking position to stop subsequent buckets.

7. The combination defined in claim 6 in which said first and fourth stops are connected together for movement in unison out of respective blocking positions and are moved by a single power actuator.

8. In a packaging machine, the combination of, an endless drive member including an endless friction band, a succession of article carriers, means guiding said carriers for movement along an endless path following said member, slip-friction connectors on said carriers engaging said band to couple the carriers releasably to the member for movement along said path by the member, a first stop disposed in a blocking position at a first preselected location along said path for engagement with opposed parts on said carriers to block movement of the carriers past said location and hold the carriers stationary as permitted by slipping of said connector relative to said band, mechanism at said first location for performing a packaging operation in connection with the carriers held stationary at said first location, a selectively operable actuator connected to said stop and operable upon demand to move said stop out of said blocking position to release a carrier and then back into the blocking position to engage and hold a subsequent carrier, a second stop disposed in a blocking position at a second preselected location along said path beyond said first location to hold the carriers stationary at said second location, additional mechanism at said second location for performing another packaging operation in connection with the carriers held stationary at said second location, a selectively operable actuator operable upon demand to move said second stop out of said blocking position to release a carrier and then back into the blocking position to engage and hold a subsequent carrier, and means automatically operating said actuators in timed relation with said packaging operations to stop and release carriers at the respective locations as required.

9. The combination defined in claim 8 in which said carriers are buckets opening upwardly along one run of said drive member and said connectors are mounted on the buckets between the latter and the member, each connector having a first clamping element disposed on one side of said band, a second clamping element disposed on the opposite side of the band, and means urging said second element into frictional engagement with the band to grip the latter between said elements.

10. The combination defined in claim 9 in which said first elements are rigidly mounted on said buckets and said second elements are pivoted on the buckets and formed with clamping surfaces swingable into and out of gripping engagement with said band.

11. The combination defined in claim 9 further including uncoupling means on each bucket projecting rearwardly toward the following bucket and engageable with the second element on the following bucket to relieve the gripping engagement whenever the following bucket abuts against the leading bucket.

12. The combination defined in claim 11 in which said uncoupling means is a wedge inserted between the leading ends of said elements when the two buckets are together.

13. The combination defined in claim 8 in which said mechanism at said first location includes means for loading a predetermined number of articles into said carrier, means counting the articles loaded into the carrier, and means actuated by said counter to operate said actuator and release the carrier when said predetermined number of articles has been loaded therein.

14. In a packaging machine, the combination of, an endless conveyor, mechanism for driving said conveyor at a preselected rate, a succession of article carriers, means guiding said carriers for movement along an endless path following said conveyor and passing successively through a loading station and a transfer station and back to said loading station, means on said carriers releasably coupling the latter to said conveyor for movement along said path by the conveyor, and for dwelling at said stations while the conveyor continues to move, means at said loading station and said transfer station for stopping each carrier entering said stations and holding the carrier in a precisely located position, a loading device operable to stack a preselected number of articles in each carrier held at said loading station, means at said loading station for sensing the delivery of articles to the carriers and releasing the carriers to the conveyor for movement to said transfer station when the preselected number has been inserted, means at said transfer station for transferring the articles out of the carrier held at the transfer station, and means operable when the transfer is completed to release the empty buckets to the conveyor for movement back toward said loading station.

References Cited

UNITED STATES PATENTS

| | | | |
|---|---|---|---|
| 1,558,691 | 10/1925 | McDermott | 198—31 |
| 2,234,460 | 3/1941 | Botley | 104—172 |
| 3,020,855 | 2/1962 | Perkins | 104—178 |

RICHARD E. AEGERTER, *Primary Examiner.*